(No Model.)
P. H. QUINN.
BELT TIGHTENER AND SHIFTER COMBINED.
No. 534,576. Patented Feb. 19, 1895.
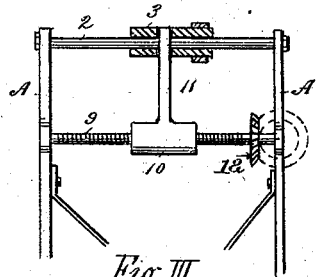
Fig. III.
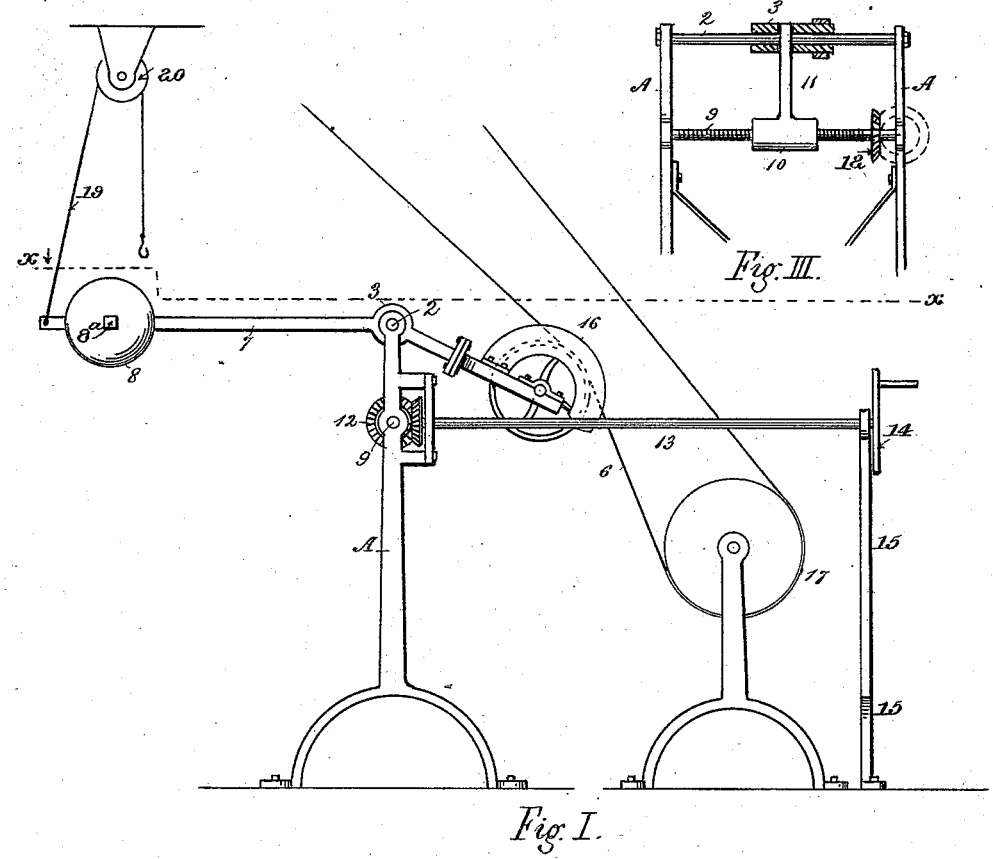
Fig. I.
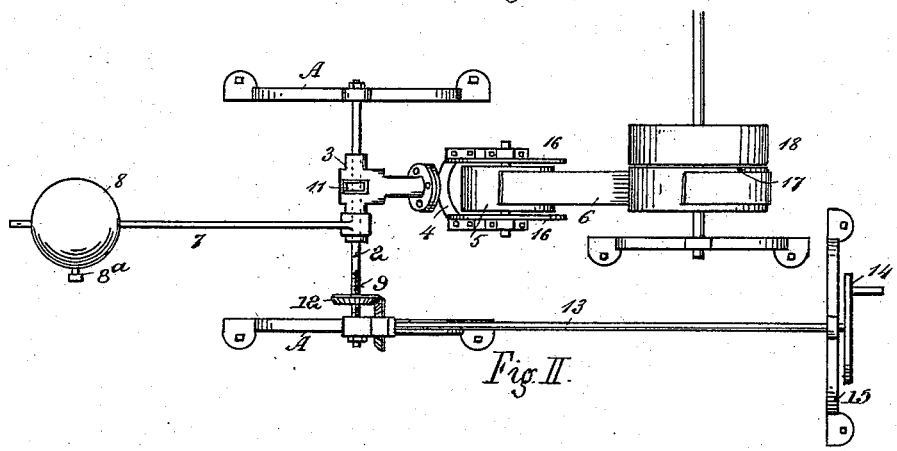
Fig. II.
WITNESSES:
R. S. Millar
L. M. Adams
INVENTOR,
P. H. Quinn,
BY
Bailey
ATTORNEY.

UNITED STATES PATENT OFFICE.

PATRICK H. QUINN, OF SALAMANCA, NEW YORK.

BELT TIGHTENER AND SHIFTER COMBINED.

SPECIFICATION forming part of Letters Patent No. 534,576, dated February 19, 1895.

Application filed October 22, 1894. Serial No. 526,640. (No model.)

*To all whom it may concern:*

Be it known that I, PATRICK H. QUINN, a citizen of the United States, residing at Salamanca, in the county of Cattaraugus and State of New York, have invented a new and useful Improvement in a Belt Tightener and Shifter Combined, which improvement is fully set forth in the following specification and accompanying drawings, in which—

Figure I is a side elevation of my improved belt tightener and shifter; Fig. II, a plan view on line $x\ x$ of Fig. 1, and Fig. III, a detail view of the traveling nut and its adjuncts.

My invention pertains to improvements in apparatus for tightening and shifting belts and its object is to provide a simple, durable and efficient device whereby a machine belt may be easily and adjustably tightened to any desired degree, and readily and safely shifted to and from a loose pulley. Other important advantages are secured as will hereinafter appear.

The peculiar construction and operation of the device will be understood by referring to the accompanying drawings, in which—

A designates a stand or frame connected at the top by a bar 2 which serves as a guide for a transversely movable sleeve 3 having a T extension by which it is connected to a yoke 4, provided with bearings which carry a tightening pulley 5 adapted to bear against the belt 6. A counterbalancing arm 7 provided with an adjustable weight 8 regulates the pressure of the pulley against the belt. This weight is provided with a set screw $8^a$, the inner end of which bears against the arm 7, and its object is to hold the weight in any position to which it may be adjusted. A screw 9 is journaled in the frame, beneath the guide bar and parallel therewith, and carries a threaded sleeve or nut 10 having an integral vertical arm 11, the upper end of which enters a slot in the sleeve 3 and has an aperture which loosely engages the guide bar. A miter wheel 12 is mounted on one end of the screw and engages a similar wheel on the crank shaft 13 which is turned by the hand wheel or crank 14 supported on a stand 15 which should be located within easy reach of the operator in charge of the machine to which the apparatus is attached. Flanges 16 which extend above the periphery of the tightening pulley are suitably attached to the yoke.

The operation of the device will now be described. If it be desired to shift the belt from the driving pulley 17, the hand wheel is turned in the proper direction causing the nut 9 to travel along the screw and draw with it the transversely movable sleeve 3 and its connections. The flange will thus engage with the edge of the belt and gradually force it over on the loose pulley 18. By reversing the movement of the hand wheel the belt will be easily replaced on the driving pulley.

If preferred the screw may be operated by a chain belt and sprocket wheels instead of the miter gear and shaft as described.

In many factories, it frequently becomes necessary to allow one or more of the machines to remain idle for a considerable length of time while the motive power continues its operation. In that event my device will be found peculiarly desirable and valuable. The counterbalancing arm may be easily raised and kept suspended by a cord 19, which passes over a pulley 20 as shown in the drawings. The belt is thus relaxed and the pulley being relieved from pressure cannot become heated by friction. The wear upon the bearings and waste of lubricating material are thus prevented.

What I claim as new is—

The combination, with the frame, the bar at the upper end thereof, the slidable sleeve mounted thereon, and formed with a slot, the tightening pulley, the flanged yoke connected with said sleeve and with the tightening pulley, and the arm provided with an adjustable weight, of the worm shaft located beneath said bar, the sleeve nut mounted thereon and having an arm engaging with the slot in said sleeve, and means substantially as described, for rotating said worm shaft.

In testimony that I claim the foregoing I have hereunto set my hand, this 17th day of October, 1894, in the presence of witnesses.

PATRICK H. QUINN.

Witnesses:
F. C. MULCAY,
F. E. FENTON.